(12) United States Patent
Kurt et al.

(10) Patent No.: US 9,896,091 B1
(45) Date of Patent: Feb. 20, 2018

(54) OPTIMIZED PATH PLANNER FOR AN AUTONOMOUS VALET PARKING SYSTEM FOR A MOTOR VEHICLE

(71) Applicants: Dura Operating, LLC, Auburn Hills, MI (US); Ohio State Innovation Foundation, Columbus, OH (US)

(72) Inventors: Arda Kurt, Dublin, OH (US); Keith Redmill, Columbus, OH (US); Umit Ozguner, Dublin, OH (US); Gordon Thomas, Beverly Hills, MI (US)

(73) Assignees: Ohio State Innovation Foundation, Columbus, OH (US); DURA Operating, LLC, Auburn Hills, MI (US)

( * ) Notice: Subject to any disclaimer, the term of this patent is extended or adjusted under 35 U.S.C. 154(b) by 50 days.

(21) Appl. No.: 15/242,169

(22) Filed: Aug. 19, 2016

(51) Int. Cl.
*B60W 30/06* (2006.01)
*G05D 1/00* (2006.01)
*G05D 1/02* (2006.01)

(52) U.S. Cl.
CPC .......... *B60W 30/06* (2013.01); *G05D 1/0088* (2013.01); *G05D 1/0212* (2013.01); *B60W 2510/109* (2013.01); *B60W 2510/20* (2013.01); *B60W 2520/06* (2013.01)

(58) Field of Classification Search
CPC .......... B60W 30/06; B60W 2510/109; B60W 2510/20; B60W 2520/06; G05D 1/0088; G05D 1/0212
See application file for complete search history.

(56) References Cited

U.S. PATENT DOCUMENTS

| | | | |
|---|---|---|---|
| 7,844,377 B2 | 11/2010 | Oota et al. | |
| 7,969,558 B2 | 6/2011 | Hall | |
| 8,675,181 B2 | 3/2014 | Hall | |
| 8,767,190 B2 | 7/2014 | Hall | |
| 9,194,168 B1 | 11/2015 | Lu et al. | |
| 2005/0216181 A1* | 9/2005 | Estkowski | G01C 21/20 701/411 |
| 2010/0020306 A1 | 1/2010 | Hall | |
| 2011/0216304 A1 | 9/2011 | Hall | |
| 2013/0231824 A1* | 9/2013 | Wilson | G05D 1/0246 701/26 |
| 2015/0073645 A1 | 3/2015 | Davidsson et al. | |

FOREIGN PATENT DOCUMENTS

EP      1499522 B1   12/2009
WO   2016066355 A1    5/2016

* cited by examiner

*Primary Examiner* — Aaron L Troost
(74) *Attorney, Agent, or Firm* — Robert E. Ford; Steven L. Crane; Raymond J. Vivacqua

(57) ABSTRACT

A method for autonomously parking or un-parking a motor vehicle includes locating the motor vehicle relative to a parking area, selecting a destination location within the parking area, generating a path from the location of the motor vehicle to the destination location, wherein the path includes a plurality of linked nodes, each node having a cost associated therewith, wherein the cost of a child node is equal to an inherited cost plus a base cost and a change cost, wherein the change cost is a function of characteristics of a parent node, and autonomously driving the motor vehicle along the path from the location of the motor vehicle to the destination location.

20 Claims, 3 Drawing Sheets

OPTIMIZED PATH PLANNER FOR AN AUTONOMOUS VALET PARKING SYSTEM FOR A MOTOR VEHICLE

FIELD

The invention relates generally to autonomous driver assistance systems for motor vehicles, and more particularly to an optimized path planner method for autonomous driver assistance systems for parking and un-parking or retrieving a motor vehicle.

BACKGROUND

The statements in this section merely provide background information related to the present disclosure and may or may not constitute prior art.

Smart car technologies such as free-ranging on grid navigation, as well as parking guidance and information systems, aid in the prevention of human error when drivers operate a vehicle. Such technologies have been used to improve navigation of roadways, and to augment the parking abilities of motor vehicle drivers while the drivers are present within the motor vehicle. For example, rear view camera systems and impact alert systems have been developed to assist the operator of the motor vehicle while parking to avoid collisions. In addition, autonomous parking systems have been developed that autonomously park the motor vehicle in a parallel parking spot once the operator of the motor vehicle has positioned the motor vehicle in a predefined location proximate the parking spot.

While these systems are useful for their intended purpose, they require that the operator of the motor vehicle locate the parking spot and drive to the parking spot. Thus, there is a need in the art for improved smart car technologies that utilize preexisting infrastructure to autonomously park a motor vehicle. Moreover, there is a need to implement automatic parking systems in motor vehicles that are optimized to mimic human drivers by reducing certain behavior patterns that emerge in path planning.

SUMMARY

A method for autonomously parking or un-parking a motor vehicle is provided. The method includes locating the motor vehicle relative to a parking area, selecting a destination location within the parking area, generating a path from the location of the motor vehicle to the destination location, wherein the path includes a plurality of linked nodes, each node having a cost associated therewith, wherein the cost of a child node is equal to an inherited cost plus a base cost and a change cost, wherein the change cost is a function of characteristics of a parent node, and autonomously driving the motor vehicle along the path from the location of the motor vehicle to the destination location.

In one aspect, the change cost includes a turning cost and a direction cost.

In another aspect, the characteristics include a location of the plurality of linked nodes in the parking area and a heading.

In another aspect, the method further includes increasing the turning cost of the child node if a difference between the heading of the parent node and the child node is greater than a predetermined amount.

In another aspect, the method further includes increasing the direction cost of the child node if the parent node required a gear change between forward and reverse the child node also requires a gear change between forward and reverse.

In another aspect, the turning cost is zero if the child node has the same heading as the parent node.

In another aspect, the method further includes the turning cost is a function of a difference between a steering angle of the parent node and a steering angle of the child node.

In another aspect, the method further includes determining whether the location of the child node is within an obstructed area and only generating a path having nodes outside the obstructed area plus a safety factor.

In another aspect, the safety factor is approximately six inches.

In another aspect, the safety factor is a function of the type of obstructed area.

In another aspect, the base cost of the child node is a function a distance from the child node to the destination location.

In another aspect, the base cost of the child node is also a function of a distance from the parent node to the destination location.

In another aspect, the base cost is the difference between the distance from the child node to the destination location and the distance from the parent node to the destination location.

In another aspect, the inherited cost of the child node is equal to the cost of the parent node.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application or uses.

Figure 1:
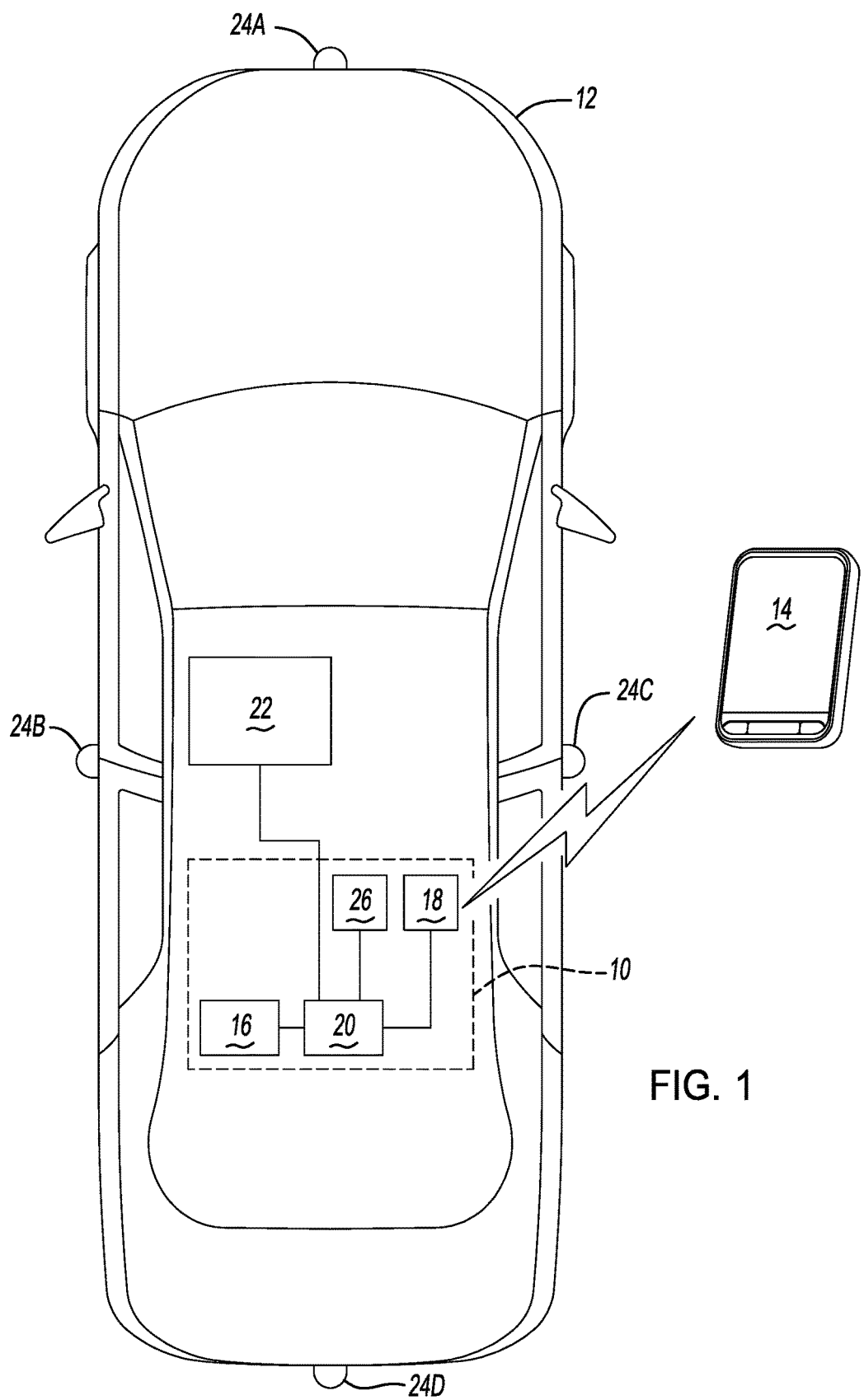
FIG. 1 is a schematic diagram of an exemplary motor vehicle having an automatic valet system according to the principles of the present disclosure.

With reference to FIG. 1, an autonomous valet system according to the principles of the present disclosure is indicated by reference number 10. The autonomous valet system 10 is used with an exemplary motor vehicle 12 and an exemplary mobile device 14. The motor vehicle 12 is illustrated as a passenger vehicle, however, the motor vehicle 12 may be a truck, sport utility vehicle, van, motor home, or any other type of vehicle without departing from the scope of the present disclosure. The mobile device 14 is preferably a mobile phone, however, the mobile device 14 may be a mobile computer, laptop, tablet, smart watch, or any other device in wireless communication with the motor vehicle 12. The autonomous valet system 10 runs an autonomous valet method or application, as will be described in greater detail below.

The autonomous valet system 10 is operable to autonomously park and un-park the motor vehicle 12. The autonomous valet system 10 may have various configurations without departing from the scope of the present disclosure but generally includes a sensor sub-system 16 and a communication sub-system 18 each in communication with a controller 20. The controller 20 communicates with a vehicle control system 22. The sensor sub-system 16 includes a plurality of sensors 24A-D mounted along the periphery of the motor vehicle 12. In the example provided, the sensors 24A-D are located at the front, left, right, and rear of the motor vehicle 12, respectively, to provide 360 degrees of overlapping coverage. However, it should be appreciated that the sensor sub-system 16 may have any number of sensors 24 without departing from the scope of the disclosure. Each of the sensors 24A-D is operable to collect or sense information in a predefined area surrounding the motor vehicle 12. Information from the sensors 24A-D is communicated to the controller 20. In a preferred embodiment, the sensors 24A-D are Light Detection and Ranging (LiDAR) sensors. However, the sensors 24A-D may be cameras, radar or sonar sensors, or any other type of proximity sensors. The communication sub-system 18 includes a receiver/transmitter operable to receive and/or transmit wireless data to the mobile device 14. The wireless data is communicated to the controller 20. In addition, the communication sub-system 18 may communicate with other vehicles (vehicle-to-vehicle communication), infrastructure such as a parking lot (vehicle-to-infrastructure), and may receive GPS data.

The controller 20 is a non-generalized, electronic control device having a preprogrammed digital computer or processor, memory or non-transitory computer readable medium used to store data such as control logic, instructions, image data, lookup tables, etc., and a plurality of input/output peripherals or ports. The processor is configured to execute the control logic or instructions. The controller 20 may have additional processors or additional integrated circuits in communication with the processor, such as perception logic circuits for analyzing the sensor data.

The controller 20 may optionally communicate with a human machine interface (HMI) 26. The HMI 26 is disposed within the cabin of the motor vehicle 12 and is preferably a touch screen accessible by an operator of the motor vehicle 12. However, the HMI 26 may be any haptic, verbal, or gesture control system without departing from the scope of the present disclosure. The HMI 26 may be used to activate and control the autonomous valet system 10. Additionally, the mobile device 14 may be used to activate and control the autonomous valet system 10.

The vehicle control system 22 includes any systems that implement the autonomous valet functions which include parking and un-parking the motor vehicle 12. For example, the vehicle control system 22 may include a braking control system, throttle control system, steering control system, body control system, etc. The vehicle control system 22 may also include any advanced driver assistance system (ADAS) functions that automate, adapt, or enhance vehicle systems in order to increase vehicle safety and/or operator driving performance. For example, the vehicle control system 22 may include ADAS technologies that alert the driver to potential problems or to avoid collisions by implementing safeguards, such as autonomously controlling the motor vehicle 12. The vehicle control system 22 may also include ADAS features that enhance certain systems, such as automated lighting, adaptive cruise control, automated braking, or improved blind spot elimination using camera technology. Finally, it should be appreciated that the vehicle control system 22 may be part of the autonomous valet system 10 without departing from the scope of the present disclosure.

Figure 2:
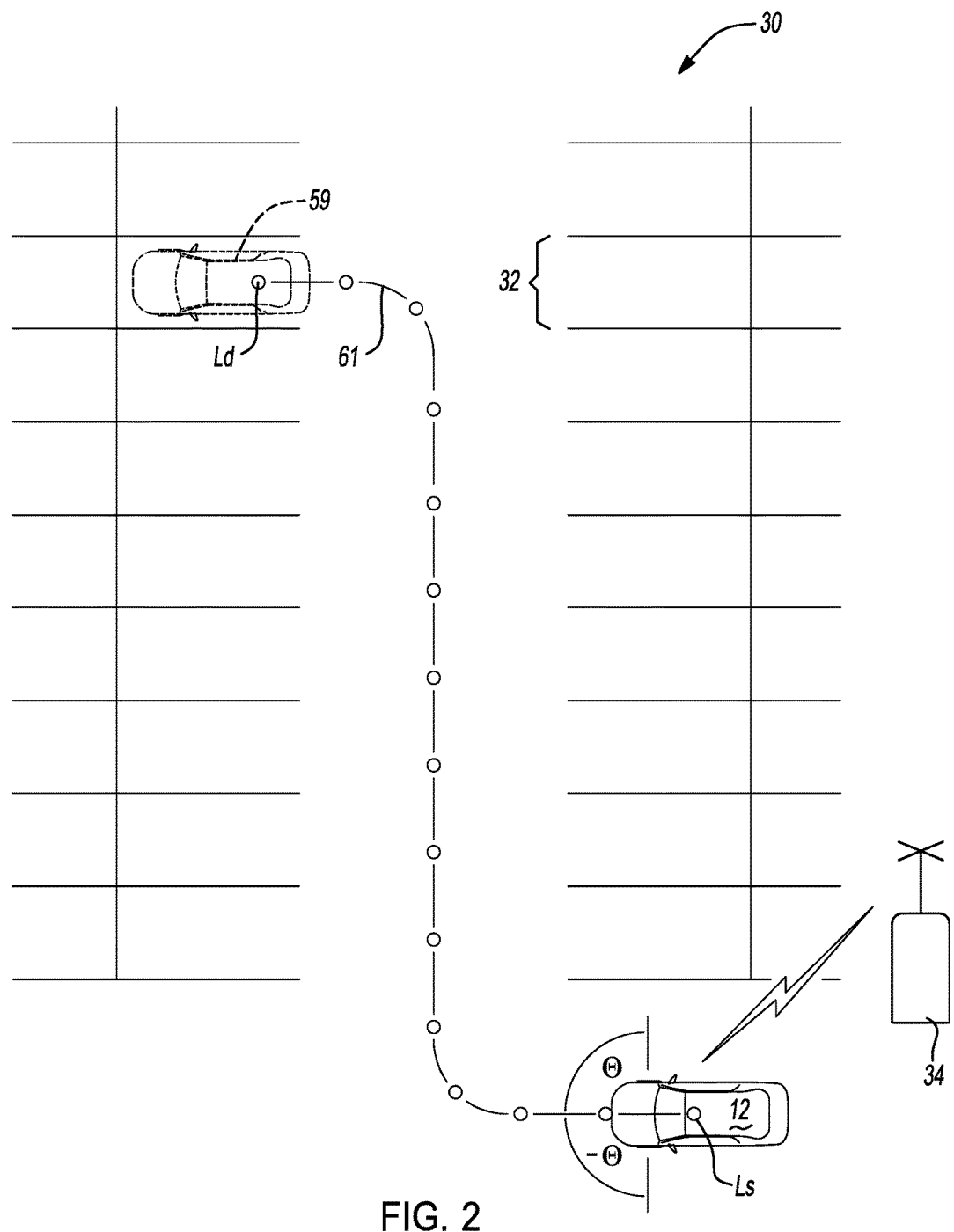
FIG. 2 is a schematic diagram of an exemplary parking area.

Turning to FIG. 2, an exemplary parking area is indicated by reference number 30. The parking area 30 includes a plurality of parking spots 32. It should be appreciated that the parking area 30 may have any configuration, may be a parking structure, and may have any number of parking spots 32 without departing from the scope of the present disclosure. The parking area 30 includes a parking area infrastructure 34 that may communicate with the motor vehicle 12.

Figure 3:
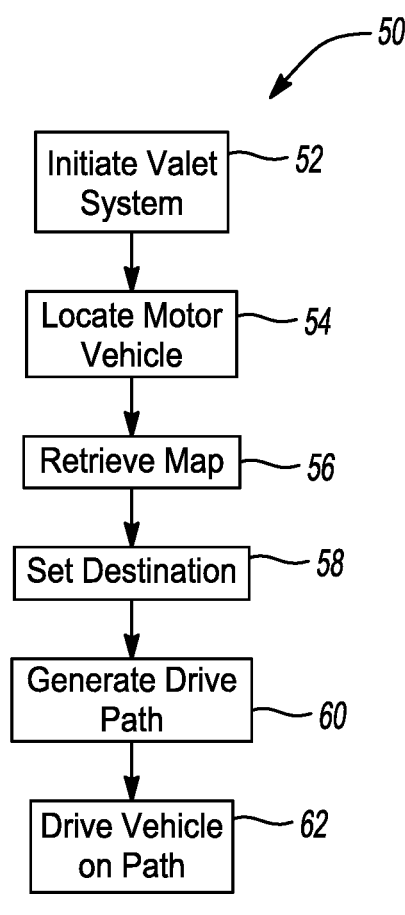
FIG. 3 is a flow chart depicting a method for autonomously parking and un-parking the motor vehicle according to the principles of the present disclosure.

With reference to FIG. 3, and continued reference to FIGS. 1 and 2, a method for autonomously parking and un-parking the motor vehicle 12 in the parking area 30 is indicated by reference number 50. By way of example, the method 50 illustrates parking the motor vehicle 12 within the parking area 30. However, it should be appreciated that the method 50 may be used identically when un-parking or retrieving the motor vehicle 12 from the parking area 30. The method 50 begins at step 52 where an operator of the motor vehicle 12 initiates or activates the autonomous valet system 10 using either the HMI 26 or the mobile device 14. For example, when parking, the operator may use the HMI 26 while during un-parking the operator may use the mobile device 14.

At step 54, the motor vehicle 12 is located within, or relative to, the parking area 30. The motor vehicle 12 may be located in the parking area 30 by positioning the motor vehicle 12 in a predefined starting location or parking spot or by GPS coordinates. At step 56 the motor vehicle 12 communicates with the parking area infrastructure to receive a map of the parking area 30. The map may be defined as a Cartesian coordinate system with x and y coordinates. The motor vehicle 12 is located on the map using (x,y,Θ) coordinates, where e is a steering angle or a heading of the motor vehicle 12. At step 58, a destination is set in the parking area 30. In the example provided, the destination is a parking spot indicated by reference number 59 in FIG. 2. The destination may be selected by an operator of the motor vehicle 12 or may be assigned by the parking area infrastructure 34 based on open or available parking spots 32. Alternatively, in an un-park mode, the destination location may be the location of the mobile device 14. It should be appreciated that steps 54-58 may be done in various orders or simultaneously without departing from the scope of the present disclosure.

Next, at step 60, a node tree path planner is generated from the location of the motor vehicle 12 to the destination location 59. From the node tree path planner a lowest cost path is selected, as shown by reference number 61 in FIG. 2. The lowest cost path 61 operates as a path for the motor vehicle 12 to take from the starting location to the destination location 59. Finally, at step 62, the autonomous valet system 10 drives the mover vehicle along the lowest cost path 61 using the vehicle control system 22. The sensor sub-system 16 may be used during autonomous driving to avoid obstacles not located in the predefined parking area map, such as pedestrians, other vehicles, etc.

Figure 4:
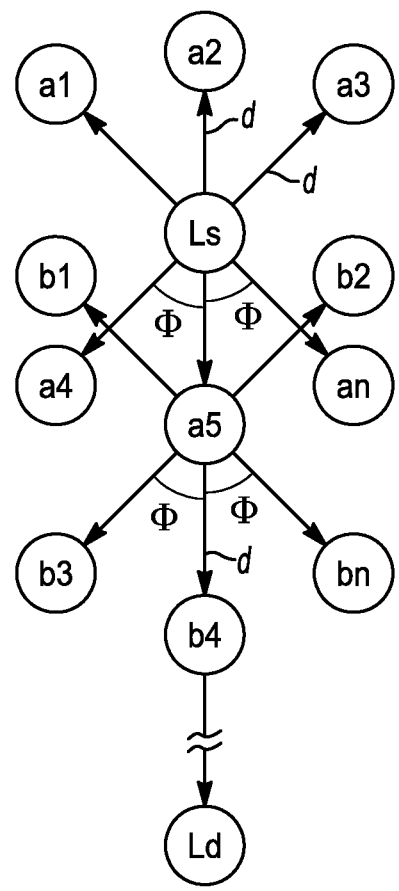
FIG. 4 is an example of a node tree used in the method for autonomously parking and un-parking the motor vehicle.

Turning now to FIG. 4, the method of generating the node tree path planner will now be described in greater detail. The node tree path planner begins by generating a first set of nodes, or parent nodes, $a_1, a_2, a_3, a_4, a_5 \ldots a_n$ from the starting location $L_s$ of the motor vehicle 12. Each node is generated a distance 'd' from the starting location $L_s$ at a predefined turn angle $\varphi$. It should be appreciated that any number of nodes may be generated however, in a preferred embodiment, nine forward nodes are generated and nine reverse nodes are generated. The distance d may have various values but is preferably approximately 2 meters. The turn angle $\varphi$ may also have various values but preferably equally divides the nodes from straight ahead to a full right turn and a full left turn. Each of the nodes is defined by $(x,y,\Theta)$ coordinates. Next, any nodes that are blocked by the parking area map are removed.

Once the first set of nodes are generated, the node tree path planner assigns a cost to each of the nodes. The cost for each node in the first set is equal to a base cost plus a turning cost. The base cost is a function of the distance from the node to the destination location $L_d$. Thus, the closer the node is to the destination location $L_d$, the lower the base cost. The turning cost increases with an increase in the steering angle $\Theta$. In other words, the larger the turn required to reach the node, the greater the cost. If the node is a reverse node that would require the motor vehicle to change gears, an additional reverse cost is added to the node.

Once the nodes have been assigned a cost, the node tree path planner selects the lowest cost node, such as node $a_5$ in the example provided, and generates another set of nodes, or child nodes, $b_1, b_2, b_3, b_4 \ldots b_n$ from the selected lowest cost node. Each of the child nodes are generated at a distance d from the selected lowest cost node ($a_5$) at turn angles $\varphi$. Any nodes previously generated nodes are not generated again.

Next, any newly generated nodes are compared to the parking area map or a list of obstructed areas. Any nodes located in areas designated as obstructed by the parking area map are not generated. Moreover, any nodes within a certain distance, or safety factor, from the obstructed areas are not generated. For example, a safety factor of six inches may be used. Thus, the motor vehicle will not be parked or drive too close to obstructed areas. The safety factor may be a function of the type of obstructed area. For example, where the obstructed area is a car, the safety factor may be increased to account for opening doors. Where the obstructed area is a curb, the safety factor may be reduced. Where the obstructed area is simply a boundary line with no real obstructions, the safety factor may be reduced to zero.

Next, costs are assigned to each child node $b_1, b_2, b_3, b_4 \ldots b_n$. The cost of a child node is equal to an inherited cost plus a base cost and a change cost. The inherited cost is the cost of the parent node ($a_5$ in the example provided). Thus, the child node inherits the costs of any previously generated nodes linked to the child node. The base cost is a function of the distance from the child node and parent node to the destination location $L_d$. The change cost is a function of the characteristics of the parent node compared to the child node. For example, the change cost may include a turning cost and a direction cost. In order to discourage serpentine paths or zig-zagging, the turning cost of the child node is increased if a difference between the heading of the parent node and the child node is greater than a predetermined amount. To favor paths that are straight, the turning cost is zero if the child node has the same heading as the parent node. To avoid too many gear changes, the direction cost is used if the parent node required a gear change between forward and reverse and the child node also requires a gear change between forward and reverse. An exemplary cost equation is provided below:

$$C\text{child} = C\text{parent} + D\text{child} - D\text{parent} + Cj \quad [1]$$

In equation [1], Cchild is the cost of the child node, Cparent is the cost of the parent node, Dchild is a distance from the child node to the destination location $L_d$, Dparent is a distance from the parent node to the destination location $L_d$, and Cj is the change cost. The change cost Cj is defined as follows:

$$Cj = 5.0 \text{ if gear of child node does not equal gear of parent node} \quad [2]$$

$$Cj = 1.5 \text{ if gear of child node is equal to gear of parent node and heading of child node does not equal heading of parent node} \quad [3]$$

$$Cj = 1.0 \text{ otherwise} \quad [4]$$

The distance between the child node and the target destination $L_d$ is determined by the following equation:

$$D\text{child} = \sqrt{(x\text{child} - x\text{target})^2 + (y\text{child} - y\text{target})^2} \quad [5]$$

In equation [5], xchild is the x coordinate of the child node, ychild is the y coordinate of the child node, xtarget is the x coordinate of the destination location $L_d$, and ytarget is the y coordinate of the destination location $L_d$. The distance between the parent node and the target destination $L_d$, Dparent, is found in substantially the same way.

In one embodiment, the base cost also includes a generation cost which is a function of which generation the node is from the starting location node. The tree node path planner then selects the lowest cost node from all of the nodes generated thus far and repeats the method until a newly generated node is at the destination location $L_d$.

Once a node is at the location $L_d$, the node tree path planner traces the path back to the starting location $L_s$ and sets the path 61. Thus, the path 61 is the lowest cost path with optimized driving characteristics, e.g., reduced turning, gear changes, proximity to other objects, etc. The motor vehicle 12 may be driven from node to node along the path or may be driven along an average or weighted curve along the path.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for autonomously parking or un-parking a motor vehicle, the method comprising:
   locating the motor vehicle relative to a parking area;
   selecting a destination location within the parking area;
   generating a path from the location of the motor vehicle to the destination location, wherein the path includes a plurality of linked nodes, each node having a cost associated therewith, wherein the cost of a child node is equal to an inherited cost plus a base cost and a change cost, wherein the change cost is a function of characteristics of a parent node;
   autonomously driving the motor vehicle along the path from the location of the motor vehicle to the destination location.

2. The method of claim 1 wherein the change cost includes a turning cost and a direction cost.

3. The method of claim 2 wherein the characteristics include a location of the plurality of linked nodes in the parking area and a heading.

4. The method of claim 3 further comprising increasing the turning cost of the child node if a difference between the heading of the parent node and the child node is greater than a predetermined amount.

5. The method of claim 3 further comprising increasing the direction cost of the child node if the parent node required a gear change between forward and reverse the child node also requires a gear change between forward and reverse.

6. The method of claim 3 wherein the turning cost is zero if the child node has the same heading as the parent node.

7. The method of claim 3 wherein the turning cost is a function of a difference between a steering angle of the parent node and a steering angle of the child node.

8. The method of claim 3 further comprising determining whether the location of the child node is within an obstructed area and only generating a path having nodes outside the obstructed area plus a safety factor.

9. The method of claim 8 wherein the safety factor is approximately six inches.

10. The method of claim 8 wherein the safety factor is a function of the type of obstructed area.

11. The method of claim 1 wherein the base cost of the child node is a function a distance from the child node to the destination location.

12. The method of claim 11 wherein the base cost of the child node is also a function of a distance from the parent node to the destination location.

13. The method of claim 1 wherein the base cost is the difference between the distance from the child node to the destination location and the distance from the parent node to the destination location.

14. The method of claim 1 wherein the inherited cost of the child node is equal to the cost of the parent node.

15. A method for autonomously parking or un-parking a motor vehicle, the method comprising:
   locating the motor vehicle relative to a parking area;
   setting a destination location within the parking area;
   generating a path comprising the steps of:
      (a) generating a first set of nodes from the location of the motor vehicle;
      (b) assigning a cost to each node in the first set of nodes;
      (c) selecting a lowest cost node from the first set of nodes;
      (d) generating another set of nodes from the selected node;
      (e) assigning a cost to each of the newly generated nodes, wherein the cost is equal to an inherited cost plus a base cost and a change cost, wherein the change cost is a function of a previously generated node;
      (f) selecting a lowest cost node from all of the nodes;
      (g) repeating steps (d)-(f) until a lowest cost node is located at the destination location; and
      (h) setting a path from the location of the motor vehicle to the destination location comprising the last selected lowest cost node and parent nodes connected to the last selected lowest cost node; and
   autonomously driving the motor vehicle along the path from the location of the motor vehicle to the destination location.

16. The method of claim 15 wherein the change cost includes a turning cost and a direction cost, and generating the path further includes increasing the turning cost if a difference between a heading of the selected lowest cost node and the newly generated node is greater than a predetermined amount.

17. The method of claim 16 further comprising increasing the direction cost of the newly generated node if the selected lowest cost node required a gear change between forward and reverse the newly generated node also requires a gear change between forward and reverse.

18. The method of claim 17 wherein the turning cost is zero if the newly generated node has the same heading as the selected lowest cost node.

19. The method of claim 18 wherein generating the path further includes determining whether the location of the child node is within an obstructed area and only generating a path having nodes outside the obstructed area plus a safety factor.

20. A method for autonomously parking or un-parking a motor vehicle, the method comprising:
   locating the motor vehicle relative to a parking area;
   setting a destination location within the parking area;
   generating a path comprising the steps of:
      (a) generating a first set of nodes from the location of the motor vehicle;
      (b) assigning a cost to each node in the first set of nodes;
      (c) selecting a lowest cost node from the first set of nodes;
      (d) generating another set of nodes from the selected node;
      (e) assigning a cost to each of the newly generated nodes, wherein the cost is equal to an inherited cost plus a base cost and a change cost, wherein the change cost includes a turning cost and a direction cost, and the turning cost is zero if the newly generated node has the same heading as the selected lowest cost node, the turning cost is increased if a difference between a heading of the selected lowest cost node and the newly generated node is greater than a predetermined amount, and the direction cost is increased if the selected lowest cost node required a gear change between forward and reverse the newly generated node also requires a gear change between forward and reverse;
      (f) selecting a lowest cost node from all of the nodes;
      (g) repeating steps (d)-(f) until a lowest cost node is located at the destination location; and
      (h) setting a path from the location of the motor vehicle to the destination location comprising the last selected lowest cost node and parent nodes connected to the last selected lowest cost node; and
   autonomously driving the motor vehicle along the path from the location of the motor vehicle to the destination location.

* * * * *